(12) United States Patent
Chishti et al.

(10) Patent No.: US 10,509,669 B2
(45) Date of Patent: Dec. 17, 2019

(54) TECHNIQUES FOR BENCHMARKING PAIRING STRATEGIES IN A TASK ASSIGNMENT SYSTEM

(71) Applicant: Afiniti Europe Technologies Limited, Cheshire (GB)

(72) Inventors: Zia Chishti, Washington, DC (US); David Zachary Hudson, Washington, DC (US); Phil Davis, Bethesda, MD (US); Akbar A. Merchant, Bethesda, MD (US); Ittai Kan, McLean, VA (US)

(73) Assignee: Afiniti Europe Technologies Limited, Cheshire (GB)

( * ) Notice: Subject to any disclaimer, the term of this patent is extended or adjusted under 35 U.S.C. 154(b) by 175 days.

(21) Appl. No.: 15/807,215

(22) Filed: Nov. 8, 2017

(65) Prior Publication Data

US 2019/0138351 A1 May 9, 2019

(51) Int. Cl.
*G06F 9/46* (2006.01)
*G06F 9/48* (2006.01)
(Continued)

(52) U.S. Cl.
CPC ........ *G06F 9/4881* (2013.01); *G06F 11/3024* (2013.01); *G06F 11/3428* (2013.01)

(58) Field of Classification Search
CPC . G06F 9/4881; G06F 11/3024; G06F 11/3428
See application file for complete search history.

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Skrivanek, Smita, "Simpson's Paradox (and How to Avoid Its Effects)", published on Jun. 21, 2010, MoreStream.com LLC.*
(Continued)

*Primary Examiner* — James J Lee
(74) *Attorney, Agent, or Firm* — Wilmer Cutler Pickering Hale and Dorr LLP

(57) ABSTRACT

Techniques for benchmarking pairing strategies in a task assignment system are disclosed. In one particular embodiment, the techniques may be realized as a method for benchmarking pairing strategies in a task assignment system comprising determining first and second pluralities of historical task assignments paired using first and second pairing strategies, respectively, during a first period, determining a value attributable to each task of the first plurality of historical task assignments and the second plurality of historical task assignments during a second period after the first period, determining a difference in performance between the first and second pairing strategies based on the value attributable to each task during the second period, and outputting the difference in performance between the first pairing strategy and the second pairing strategy for benchmarking at least the first pairing strategy and the second pairing strategy.

30 Claims, 6 Drawing Sheets

(51) Int. Cl.
*G06F 11/30* (2006.01)
*G06F 11/34* (2006.01)

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,195,626 B1 * | 2/2001 | Stone ............... A63F 13/10 434/14 |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,692,899 B1 | 6/2017 | Rizvi |
| 9,712,676 B1 | 7/2017 | Chishti |
| 9,712,679 B2 | 7/2017 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |

(56) References Cited

U.S. PATENT DOCUMENTS

| | | |
|---|---|---|
| 2004/0098274 A1 | 5/2004 | Dezonno et al. |
| 2004/0101127 A1* | 5/2004 | Dezonno ............ H04M 3/523 379/265.02 |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1* | 1/2008 | Dezonno ............ H04M 3/5232 379/265.02 |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1* | 7/2009 | Spottiswoode ..... H04M 3/5233 379/265.11 |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2012/0315966 A1* | 12/2012 | Spata ............ G06F 9/4881 463/1 |
| 2013/0003959 A1 | 1/2013 | Nishikawa et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0341370 A1 | 11/2014 | Li et al. |
| 2015/0055772 A1 | 2/2015 | Klemm et al. |
| 2015/0264178 A1* | 9/2015 | Chishti ............ H04M 3/5232 379/265.05 |
| 2015/0281448 A1 | 10/2015 | Putra et al. |
| 2016/0080573 A1 | 3/2016 | Chishti |
| 2017/0171170 A1* | 6/2017 | Sun ............ H04L 63/0435 |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2009/097018 A1 | 8/2009 |

(56) References Cited

FOREIGN PATENT DOCUMENTS

| WO | WO-2010/053701 A2 | 5/2010 |
|---|---|---|
| WO | WO-2011/081514 A1 | 7/2011 |

OTHER PUBLICATIONS

Afiniti, "Afiniti® Enterprise Behavioral Pairing™ Improves Contact Center Performance," White Paper, retreived online from URL: <http://www.afinitit,com/wp-content/uploads/2016/04/Afiniti_White-Paper_Web-Email.pdf> 11 pages (2016).

Anonymous. (2006) "Performance Based Routing in Profit Call Centers," The Decision Makers' Direct, located at www.decisioncraft.com, Issue Jun. 2002 (3 pages).

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, pp. 829-836 (Dec. 1979).

Extended European Search Report issued by the European Patent Office for European Application No. 17154781.3 dated May 4, 2017 (7 pages).

Extended European Search Report issued by the European Patent Office for European Application No. 17171761.4 dated Aug. 30, 2017 (8 pages).

Gans, N. et al. (2003), "Telephone Call Centers: Tutorial, Review and Research Prospects," Manufacturing & Service Operations Management, vol. 5, No. 2, pp. 79-141.

International Preliminary Report on Patentability issued in connection with PCT Application No. PCT/US2009/066254 dated Jun. 14, 2011 (6 pages).

International Search Report and Written Opinion issued by the European Patent Office as International Searching Authority for International Application No. PCT/IB2016/001762 dated Feb. 20, 2017 (15 pages).

International Search Report and Written Opinion issued by the European Patent Office as International Searching Authority for International Application No. PCT/IB2016/001776 dated Mar. 3, 2017 (16 pages).

International Search Report and Written Opinion issued by the European Patent Office as International Searching Authority for International Application No. PCT/IB2017/000570 dated Jun. 30, 2017 (13 pages).

International Search Report issued in connection with International Application No. PCT/US13/33268 dated May 31, 2013 (2 pages).

International Search Report issued in connection with PCT Application No. PCT/US/2009/054352 dated Mar. 12, 2010, 5 pages.

International Search Report issued in connection with PCT Application No. PCT/US2008/077042 dated Mar. 13, 2009 (3 pages).

International Search Report issued in connection with PCT Application No. PCT/US2009/031611 dated Jun. 3, 2009 (5 pages).

International Search Report issued in connection with PCT Application No. PCT/US2009/066254 dated Feb. 24, 2010 (4 pages).

International Search Report issued in connection with PCT/US2009/061537 dated Jun. 7, 2010 (5 pages).

International Search Report issued in connection with PCT/US2013/033261 dated Jun. 14, 2013 (3 pages).

International Search Report issued in connection with PCT/US2013/33265 dated Jul. 9, 2013 (2 pages).

Japanese Office Action issued by the Japan Patent Office for Application No. 2015-503396 dated Jun. 29, 2016 (7 pages).

Japanese Office Action issued by the Japanese Patent Office for Japanese Application No. 2016-159338 dated Oct. 11, 2017 (12 pages).

Japanese Office Action issued by the Japanese Patent Office for Japanese Application No. 2016-189126 dated Oct. 19, 2017 (24 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Ntzoufras, "Bayesian Modeling Using Winbugs". Wiley Interscience, Chapter 5, Normal Regression Models, Oct. 18, 2007, pp. 155-220 (67 pages).

Press, W. H. and Rybicki, G. B., "Fast Algorithm for Spectral Analysis of Unevenly Sampled Data," The Astrophysical Journal, vol. 338, pp. 277-280 (Mar. 1, 1989).

Riedmiller, M. et al. (1993). "A Direct Adaptive Method for Faster Back Propagation Learning: The RPROP Algorithm," 1993 IEEE International Conference on Neural Networks, San Francisco, CA, pp. 586-591 (Mar. 28-Apr. 1, 1993).

Stanley et al., "Improving call center operations using performance-based routing strategies," Calif. Journal of Operations Management, vol. 6, No. 1, pp. 24-32 (Feb. 2008).

Subsequent Substantive Examination Report issued in connection with Philippines Application No. 1-2010-501705 dated Jul. 14, 2014 (1 page).

Substantive Examination Report issued in connection with Philippines Application No. 1/2011/500868 dated May 2, 2014 (1 page).

Written Opinion of the International Searching Aurhority issued in connection with PCT Application No. PCT/US2008/077042 dated Mar. 13, 2009, 6 pages.

Written Opinion of the International Searching Authority issued in connection with International Application No. PCT/US13/33268 dated May 31, 2013, 7 pages.

Written Opinion of the International Searching Authority issued in connection with PCT Application No. PCT/US/2009/054352 dated Mar. 12, 2010, 5 pages.

Written Opinion of the International Searching Authority issued in connection with PCT Application No. PCT/US2009/031611 dated Jun. 3, 2009, 7 pages.

Written Opinion of the International Searching Authority issued in connection with PCT Application No. PCT/US2009/066254 dated Feb. 24, 2010, 5 pages.

Written Opinion of the International Searching Authority issued in connection with PCT/US2009/061537 dated Jun. 7, 2010, 10 pages.

Written Opinion of the International Searching Authority issued in connection with PCT/US2013/033261 dated Jun. 14, 2013, 7 pages.

Written Opinion of the International Searching Authority issued in connection with PCT/US2013/33265 dated Jul. 9, 2013, 7 pages.

* cited by examiner

Benchmarking Data 200A

|      | Year 1 | Year 2 | Year 3 | Year 4 | Year 5 | Year 6 |
|------|--------|--------|--------|--------|--------|--------|
| BP   | A B C D E | A C G H | B D H | A B | B | B |
| FIFO | F G H I J | B D F I | A G I | D H | D |   |

FIG. 2A

Benchmarking Data
200B

| | Year 1 | Year 2 | Year 3 | Year 4 | Year 5 | Year 6 |
|---|---|---|---|---|---|---|
| BP | A B C D | A B D | A B D | B D | B D | B |
| FIFO | F G H I | G H I | I | | | |

FIG. 2B

Benchmarking Data 200C

| | Year 1 | Year 2 | Year 3 | Year 4 | Year 5 | Year 6 |
|---|---|---|---|---|---|---|
| BP | N/A | A G H | A | | | |
| FIFO | N/A | B D I | B D I | B D | B D | B |

FIG. 2C

TECHNIQUES FOR BENCHMARKING PAIRING STRATEGIES IN A TASK ASSIGNMENT SYSTEM

FIELD OF THE DISCLOSURE

This disclosure generally relates to benchmarking pairing strategies and, more particularly, to techniques for benchmarking pairing strategies in a task assignment system.

BACKGROUND OF THE DISCLOSURE

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on the order in which the tasks are created, and agents receive tasks ordered based on the time when those agents became available. This strategy may be referred to as a "first-in, first-out," "FIFO," or "round-robin" strategy.

Some task assignment systems may use a "performance-based routing" or "PBR" approach to ordering the queue of available agents or, occasionally, tasks. PBR ordering strategies attempt to maximize the expected outcome of each task assignment but do so typically without regard for utilizing agents in a task assignment system uniformly.

When a task assignment system changes from using one type of pairing strategy (e.g., FIFO) to another type of pairing strategy (e.g., PBR), overall task assignment system performance will continue to vary over time. It can be difficult to measure the amount of performance change attributable to using alternative pairing strategies because the amount of performance or value attributable to a given task assignment may not be realized until a later time (e.g., months or years after the initial task assignment).

In view of the foregoing, it may be understood that there is a need for a system that enables benchmarking of alternative task assignment strategies (or "pairing strategies") to measure changes in performance attributable to the alternative task assignment strategies over time.

SUMMARY OF THE DISCLOSURE

Techniques for benchmarking pairing strategies in a task assignment system are disclosed. In one particular embodiment, the techniques may be realized as a method for benchmarking pairing strategies in a task assignment system comprising determining a first plurality of historical task assignments paired using a first pairing strategy during a first period, determining a second plurality of historical task assignments paired using a second pairing strategy during the first period; determining a value attributable to each task of the first plurality of historical task assignments and the second plurality of historical task assignments during a second period after the first period, determining a difference in performance between the first and second pairing strategies based on the value attributable to each task during the second period, and outputting the difference in performance between the first pairing strategy and the second pairing strategy for benchmarking at least the first pairing strategy and the second pairing strategy, wherein the difference in performance demonstrates that the first pairing strategy optimizes performance of the task assignment system as compared to the second pairing strategy.

In accordance with other aspects of this particular embodiment, the task assignment system may be a contact center system, and the first plurality of tasks may be a first plurality of contacts and the second plurality of historical task assignments may be a second plurality of contacts.

In accordance with other aspects of this particular embodiment, the first pairing strategy may be a behavioral pairing strategy.

In accordance with other aspects of this particular embodiment, the second pairing strategy may be a FIFO strategy or a performance-based routing strategy.

In accordance with other aspects of this particular embodiment, the task assignment system may cycle among at least the first and second pairing strategies at least once per hour.

In accordance with other aspects of this particular embodiment, the difference in performance may be adjusted for the Yule-Simpson effect.

In accordance with other aspects of this particular embodiment, the difference in performance may be weighted according to a relative difference in size between the first and second pluralities of historical task assignments.

In accordance with other aspects of this particular embodiment, the first pairing strategy may assign a task to an agent during the second period irrespective of determining which of the first pairing strategy or the second pairing strategy had assigned a corresponding task during the first period.

In accordance with other aspects of this particular embodiment, the method may further comprise generating a report of statistically fair assignment of tasks during the second period irrespective of which of the first pairing strategy or the second pairing strategy had assigned any corresponding tasks during the first period.

In another particular embodiment, the techniques may be realized as a system for benchmarking pairing strategies in a task assignment system comprising at least one computer processor communicatively coupled to and configured to operate in the task assignment system, wherein the at least one computer processor is further configured to perform the steps in the above-described method.

In another particular embodiment, the techniques may be realized as an article of manufacture for benchmarking pairing strategies in a task assignment system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

FIG. 2A shows a table of benchmarking data according to embodiments of the present disclosure.

FIG. 2B shows a table of benchmarking data according to embodiments of the present disclosure.

FIG. 2C shows a table of benchmarking data according to embodiments of the present disclosure.

DETAILED DESCRIPTION

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on the order in which the tasks are created, and agents receive tasks ordered based on the time when those agents became available. This strategy may be referred to as a "first-in, first-out," "FIFO," or "round-robin" strategy.

Some task assignment systems may use a "performance-based routing" or "PBR" approach to ordering the queue of available agents or, occasionally, tasks. PBR ordering strategies attempt to maximize the expected outcome of each task assignment but do so typically without regard for utilizing agents in a task assignment system uniformly.

When a task assignment system changes from using one type of pairing strategy (e.g., FIFO) to another type of pairing strategy (e.g., PBR), overall task assignment system performance will continue to vary over time. It can be difficult to measure the amount of performance change attributable to using alternative pairing strategies because the amount of performance or value attributable to a given task assignment may not be realized until a later time (e.g., months or years after the initial task assignment).

In view of the foregoing, it may be understood that there is a need for a system that enables benchmarking of alternative task assignment strategies (or "pairing strategies") to measure changes in performance attributable to the alternative task assignment strategies over time.

Figure 1:
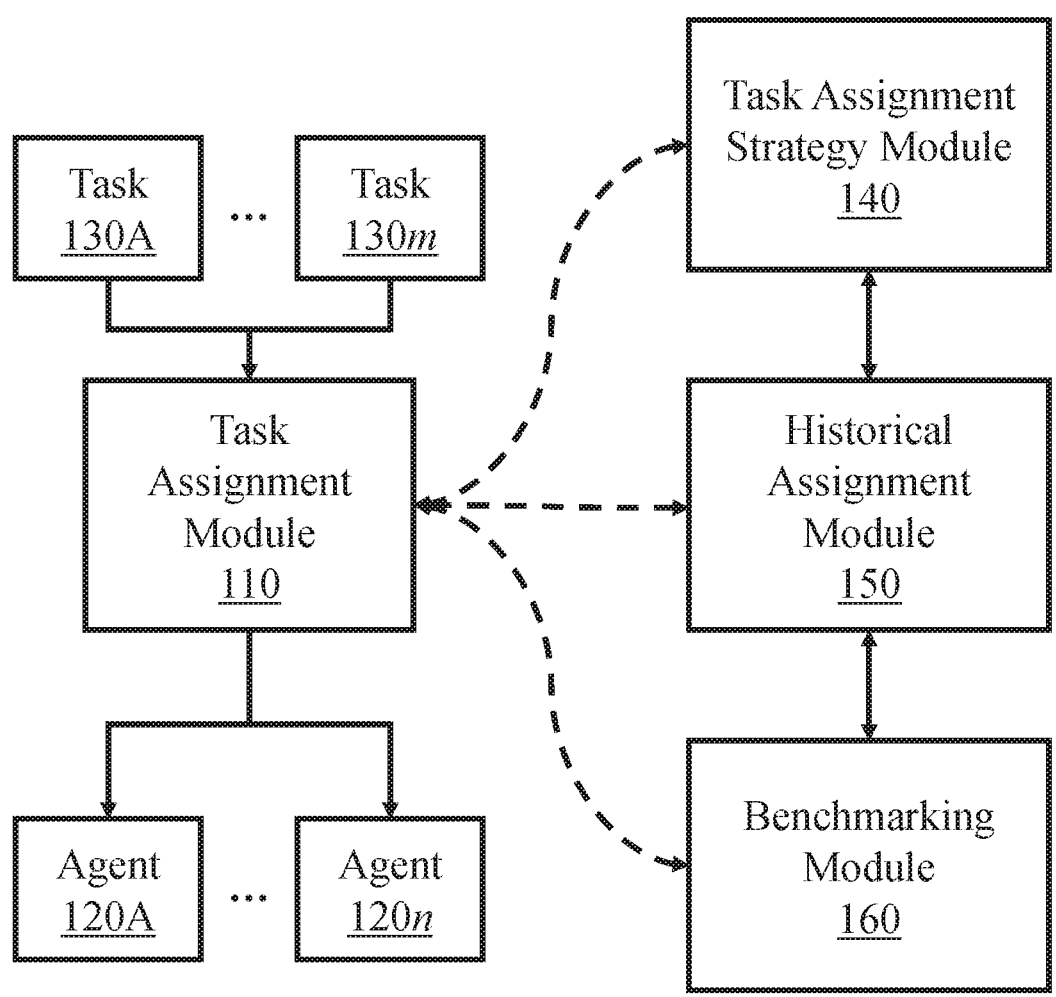
FIG. 1 shows a block diagram of a task assignment system according to embodiments of the present disclosure.

FIG. 1 shows a block diagram of a task assignment system 100 according to embodiments of the present disclosure. The description herein describes network elements, computers, and/or components of a system and method for benchmarking pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment system 100 may include a task assignment module 110. The task assignment system 100 may include a switch or other type of routing hardware and software for helping to assign tasks among various agents, including queuing or switching components or other Internet-, cloud-, or network-based hardware or software solutions.

The task assignment module 110 may receive incoming tasks. In the example of FIG. 1, the task assignment system 100 receives m tasks over a given period, tasks 130A-130m. Each of the m tasks may be assigned to an agent of the task assignment system 100 for servicing or other types of task processing. In the example of FIG. 1, n agents are available during the given period, agents 120A-120n. m and n may be arbitrarily large finite integers greater than or equal to one. In a real-world task assignment system, such as a contact center, there may be dozens, hundreds, etc. of agents logged into the contact center to interact with contacts during a shift, and the contact center may receive dozens, hundreds, thousands, etc. of contacts (e.g., calls) during the shift.

In some embodiments, a task assignment strategy module 140 may be communicatively coupled to and/or configured to operate in the task assignment system 100. The task assignment strategy module 140 may implement one or more task assignment strategies (or "pairing strategies") for assigning individual tasks to individual agents (e.g., pairing contacts with contact center agents).

A variety of different task assignment strategies may be devised and implemented by the task assignment strategy module 140. In some embodiments, a first-in/first-out ("FIFO") strategy may be implemented in which, for example, the longest-waiting agent receives the next available task (in "L1" or agent-surplus environments) or the longest-waiting task is assigned to the next available agent (in "L2" or task-surplus environments). Other FIFO and FIFO-like strategies may make assignments without relying on information specific to individual tasks or individual agents.

In other embodiments, a performance-based routing (PBR) strategy may be used for prioritizing higher-performing agents for task assignment. Under PBR, for example, the highest-performing agent among available agents receives the next available task. Other PBR and PBR-like strategies may make assignments using information about specific agents but without necessarily relying on information about specific tasks or agents.

In yet other embodiments, a behavioral pairing (BP) strategy may be used for optimally assigning tasks to agents using information about both specific tasks and specific agents. Various BP strategies may be used, such as a diagonal model BP strategy or a network flow BP strategy. These task assignment strategies and others are described in detail for the contact center context in, e.g., U.S. Pat. No. 9,300,802 and U.S. patent application Ser. No. 15/582,223, which are hereby incorporated by reference herein.

In some embodiments, a historical assignment module 150 may be communicatively coupled to and/or configured to operate in the task assignment system 100 via other modules such as the task assignment module 110 and/or the task assignment strategy module 140. The historical assignment module 150 may be responsible for various functions such as monitoring, storing, retrieving, and/or outputting information about agent task assignments that have already been made. For example, the historical assignment module 150 may monitor the task assignment module 110 to collect information about task assignments in a given period. Each record of a historical task assignment may include information such as an agent identifier, a task or task type identifier, outcome information, or a pairing strategy identifier (i.e., an identifier indicating whether a task assignment was made using a BP pairing strategy or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or similar computer processor-generated model based on a set of historical assignments for a period of time (e.g., the past week, the past month, the past year, etc.), which may be used by the task assignment strategy module 140 to make task assignment recommendations or instructions to the task assignment module 110. In other embodiments, the historical assignment module 150 may send historical assignment information to another module such as the task assignment strategy module 140 or the benchmarking module 160.

In some embodiments, a benchmarking module 160 may be communicatively coupled to and/or configured to operate in the task assignment system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. The techniques for benchmarking and other functionality performed by the benchmarking module 160 for various task assignment strategies and various contexts are described in later sections throughout the present disclosure. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 100 while it was optimized or otherwise configured to use one task assignment strategy instead of another.

In some task assignment systems, techniques for benchmarking task assignment strategies may primarily consider an instant outcome for each historical task assignment. For example, in a sales queue of a contact center, conversion rate may be measured by tracking whether contacts (e.g., callers) make a purchase during their interactions with agents. A benchmarking module or another component may track which contacts were paired with one pairing strategy (e.g., BP) as opposed to an alternative pairing strategy (e.g., FIFO or PBR). The benchmarking module may determine the relative performance of BP over the alternative pairing strategy or strategies by comparing the relative conversion rates of each pairing strategy.

In some task assignment systems, a value (e.g., monetary value or other compensation) may be ascribed to the relative performance. For example, the value may be based on cost of acquisition, amount of sale, average revenue per user (ARPU), etc. This value may be used to determine compensation to be paid to a vendor or other third-party provider of the optimized task assignment strategy. For example, the compensation may be a percentage of the value attributable to the optimized task assignment strategy.

However, there may be several shortcomings to relying primarily on instant outcomes for each historical task assignment. First, a value based on ARPU does not capture actual lifetime revenue attributable to the task assignment over time. For example, in a sales queue of a contact center for subscription services (e.g., cellphone or cable television subscriptions), the ARPU for a given subscriber may be based on the assumption that the tenure of an average subscriber is 24 months. However, relatively fickle subscribers may cancel their subscription after a shorter period, resulting in actual lifetime revenue lower than expected revenue based on ARPU and expected tenure, while relatively loyal subscribers may maintain their subscriptions for a longer period, resulting in actual lifetime revenue higher than expected revenue based on ARPU and expected tenure. Thus, a benchmark based on instant outcomes may over- or underestimate the relative performance of alternative task assignment strategies depending on whether subscribers acquired from one strategy or another tend to result in actual lifetime revenue higher or lower than expected revenue.

Second, for task assignment systems in which a vendor is compensated based on ARPU and expected tenure for a relative performance in a given period (e.g., day, week, month), the entirety of the estimated value would be due or otherwise collectible following the instant outcome. For example, in a sales queue of a contact center for subscription services (e.g., cellphone or cable television subscriptions), even though the subscriber may only owe a fraction of the value attributable to the optimized task assignment strategy to the operator at the time, the vendor may be entitled to compensation months or years before the value has been realized by the operator based on the estimated value of the outcome. The timing may lead to cash flow or budgeting concerns for the operator.

As described in detail below, these shortcomings may be overcome by tracking and measuring the actual performance of historical task assignments over time rather than primarily considering instant outcomes. These techniques are sometimes referred to as "cohort tracking" or "cohort modeling" because a new cohort or group of historical task assignments may be tracked for each time period in which these techniques for benchmarking may be applied. Measurements taken for cohort tracking may facilitate measuring actual value and performance over time, and these measurements may also enable the generation of behavioral pairing models optimized for value over time instead of primarily optimizing for instant outcomes. Thus, the optimizations enabled by the task assignment strategy may be better aligned with the operator's long-term goals such as increased ARPU, increased customer loyalty/tenure/satisfaction, decreased costs, increased internal rate of return on acquisition costs, etc.

FIGS. 2A-C show tables of benchmarking data 200A-C, respectively, according to embodiments of the present disclosure. The following section with reference to FIGS. 2A-C describes an example of cohort tracking in the context of a contact center system.

In this highly simplified hypothetical, there are a total of ten customers identified as A-J. Each customer has a 12-month subscription. The contact center cycles between two contact assignment strategies, BP and FIFO, with each strategy used for 50% of the contact interactions. In other environments, there may be an arbitrarily large number of customers, with varying subscription options and durations, different benchmarking techniques for cycling among various contact assignment strategies may be used, and shorter or longer cohort tracking periods and durations (e.g., monthly for five years; weekly for ten years, yearly for eight years, etc.).

As shown in benchmarking data 200A (FIG. 2A), in Year 1, each customer A-J calls to discuss their contract renewal. Customers A-E were paired using BP, and customers F-J were paired using FIFO. During Year 1, for each of the pairing strategies, four of the five customers chose to renew their contracts (customers A-D for BP and customers F-I for FIFO), and one customer for each of the pairing strategies chose not to renew (customer E for BP and customer J for FIFO, both shown with strikethrough typeface). In Year 2, customers E and J are no longer customers, and they do not call. The remaining customers A-D and F-I each call to discuss their contract renewal again, and customers C and F chose not to renew. This process continues in Years 3-6: In Year 3, customers H and G chose not to renew; in Year 4, customers A and I chose not to renew; in Year 5, customer D chose not to renew; and, in Year 6, only customer B, who chose to renew again, remains as a customer.

In some embodiments, as in this example, it does not matter whether a member of the cohort was paired using BP in one year and FIFO the next, or vice versa. Each customer interaction may be treated independently without regard for which pairing strategy handled assignment of the customer for prior interactions.

Whereas FIG. 2A shows the contact interactions for each pairing strategy for each year, FIGS. 2B and 2C show the evolution of the Year 1 and Year 2 cohorts, respectively, for each year of measurement.

As shown in benchmarking data 200B (FIG. 2B), the Year 1 cohort (or "Y1 cohort") includes customers A-D for BP and customers F-I for FIFO. Assuming that each customer's renewal has the same value, and BP and FIFO had an equal number of contact interactions, the relative performance gain of BP over FIFO for Year 1 is 0 (four customers for BP less four customers for FIFO). After Year 2, the Year 1 cohort may be measured again: Customers A, B, and D remain in the Y1 cohort for BP after Year 2, and customer G, H, and I remain in the Y1 cohort for FIFO after Year 2. Again, the relative performance difference is 0 (three customers for BP less three customers for FIFO). After Year 3, customers A, B, and D still remain in the Y1 cohort for BP, but only customer I remains in the Y1 cohort for FIFO. Now, the relative performance gain of BP over FIFO with respect to the Y1 cohort is +2.

In these embodiments, it does not matter to the Y1 cohort whether a customer is paired with BP or FIFO in a subsequent measurement period. For example, in Year 2, customer B was paired with FIFO and chose to renew, so it remains in the Y1 cohort for BP.

Similarly, after Year 2, the Year 2 cohort is determined based on the callers who renewed in Year 2. As shown in benchmarking data 200C (FIG. 2C), the Year 2 cohort (or "Y2 cohort") includes customers A, G, and H for BP, and customers B, D, and I for FIFO. In these embodiments, it does not matter to the Y2 cohort whether a customer was paired with BP or FIFO in a prior period. For example, in Year 1, customer B was paired with BP and became part of the Y1 cohort for BP.

The relative performance gain for the Y2 cohort after Year 2 is 0 (three customers for BP less three customers for FIFO). After Year 3, only customer A remains in the Y2 cohort for BP, and customers B, D, and I still remain in the Y2 cohort for FIFO, so the relative performance of BP over FIFO with respect to the Y2 cohort is −2.

After Year 2, taking both the Y1 and Y2 cohorts into account, the relative performance difference is 2 for Y1 cohort plus −2 for the Y2 cohort, for a net performance difference of 0 after Year 2. After Year 3, the relative performance differences are 2 for the Y1 cohort plus −2 for the Y2 cohort for a net difference of 0.

In each period, a new cohort may be defined. For example, after Year 3, a Y3 cohort may be defined, with a relative performance difference of 0. When determining the net performance difference for each year, each cohort may be taken into account. Thus, after Year 3, the net performance difference accounting for all of the Y1, Y2, and Y3 cohorts is 2 for the Y1 cohort plus −2 for the Y2 cohort plus 0 for the Y3 cohort for a net difference of 0.

The net differences after Year 4 (counting the Y1-Y4 cohorts), Year 5 (counting the Y1-Y5 cohorts), and Year 6 (counting the Y1-Y6 cohorts) are 0, 3, and 3, respectively.

In some embodiments, the relative performance difference may be weighted based on the actual number of calls assigned using each pairing strategy. For example, in Year 6, BP assigned one call (customer B), but no calls were assigned using FIFO. Consequently, the weighted performance difference for the first year of the Y6 cohort may be 0.

In some embodiments, it may take several measurement periods to "ramp-up" the benchmark. For example, after Year 1, there is only one cohort (the Y1 cohort) and one year's worth of measurement data to compute the benchmark. After Year 2, there are two cohorts and two years' worth of measurement data, and so on. Moreover, in a real-world example, additional callers (e.g., customers K-Q, etc.) would subscribe and renew for the first time in subsequent years.

In some embodiments, a customer may only be tracked for a limited duration (e.g., five years, ten years, etc.). If this example had been limited to five-year tracking, then customer B's renewal in Year 6 would only be relevant to the Y2-Y6 cohorts and would no longer be tracked for the Y1 cohort. Subsequently, the net (or "cumulative") performance determined after Year 6 would only look to the performance differences measured for the Y2-Y6 cohorts. In this example, the +1 for the Y1 cohort would be disregarded, and the cumulative difference would be the sum of −1 for Y2, 1 for Y3, 1 for Y4, 1 for Y5, and 0 for Y6 (weighted), for a total of 2 instead of 3.

As described in the example above, benchmarking with cohort tracking accounts for the value of a customer over time. For example, customer B had a relatively long tenure, and the Y1 cohort for BP was credited for this tenure six times (and counting), the Y2 cohort was credited for this tenure 5 times (and counting), and so on. In contrast, customer A had a relatively short tenure, and the Y1 cohort for BP was credited for this tenure three times, and the Y2 cohort was credited 2 times.

The example above also shows that the same customer can appear in multiple cohorts and for multiple pairing strategies. Indeed, in some examples, it may be possible for a customer to appear in the same cohort multiple times, for one or more pairing strategies, depending on how many times the customer called during the given measurement period. Because each task (here, contact interaction) is effectively randomly assigned to a pairing strategy for each interaction, the cohort tracking may be configured as described above to credit the pairing strategy responsible for the outcome during the given period and each subsequent period for which the customer gives value/revenue to the contact center operator. Occasionally a successful or unsuccessful instant outcome in one period may effectively "cancel out" successful outcomes in earlier periods, but the overall cumulative net performance effectively measures the relative performance of one pairing strategy over another over time.

In some embodiments, a benchmarking module 160 or similar component may cause the task assignment system to cycle between BP and an alternative (e.g., baseline or incumbent) strategy over time periods, such as 50% BP on and 50% BP off, 80%/20%, etc. These time periods may be relatively short, e.g., switching at least once every half hour, hour, etc.

In some embodiments, the benefit (e.g., value attributable to relative performance gain) of BP may be measured by tracking BP on cohorts and BP off cohorts over a longer period (e.g., each month for 60 months, each year for ten years, etc.). The month (or, e.g., year) in which the cohort is established may be referred to as a "base month" and each month for the following five years (or, e.g., ten years) may be referred to as "measurement months." In any given period (e.g., 12 months), there will be 12 base months, and each of those base months will have 60 follow-on measurement months.

In some embodiments, the basis for measuring a value or benefit (e.g., revenue) in each measurement month associated with a base month may be the tracking of all tasks (e.g., customer interactions) associated with BP on for a base month and those with BP off for a base month. In each measurement month following a base month, the average revenue from customer interactions in the BP on cohort may be compared with the average revenue from customer interactions in the BP off cohort (as established in the relevant base month). The difference in average revenue between the two cohorts may be weighted (e.g., multiplied) by the number of tasks/interactions from BP on in the base month to determine the value or benefit attributable to BP in a given measurement month.

In some embodiments, a BP vendor may invoice a fee for providing the value or benefit attributable to BP. The fee may be a pay-for-performance fee as a function of the value or benefit delivered.

In some embodiments, it may be possible that a cohort contains unknown customers, in which case these unknown customers may be treated as providing the same value or benefit as known customers that did not make any changes to their accounts.

In some embodiments, it may be possible that the BP vendor and/or operator may no longer want or be able to continue tracking cohorts, in which the remaining value or benefit that would have been attributable to BP for the remaining measurement months may be estimated. In some contexts, the remaining value or benefit may be used to compute a final fee for the BP vendor.

In some embodiments, the net performance may be determined (e.g., adjusted or corrected) to account for various statistical phenomena such as the Yule-Simpson effect. See, e.g., U.S. Pat. No. 9,692,899, which is hereby incorporated by reference herein.

In some embodiments, the pairing strategy may be blind to a contact's inclusion in earlier cohorts. Ignoring information about a contact's status in earlier cohorts eliminates a risk of bias in the pairing strategy. For example, a nefarious pairing strategy could, hypothetically, be optimized to make intentionally poor pairing choices to eliminate contacts from earlier cohorts associated with an alternative or underlying pairing strategy (e.g., "BP Off" or FIFO).

In some embodiments, a report may be generated showing statistically fair treatment of all contacts irrespective of their presence in earlier cohorts associated with either the "on" or "off" pairing strategies.

Figure 3:
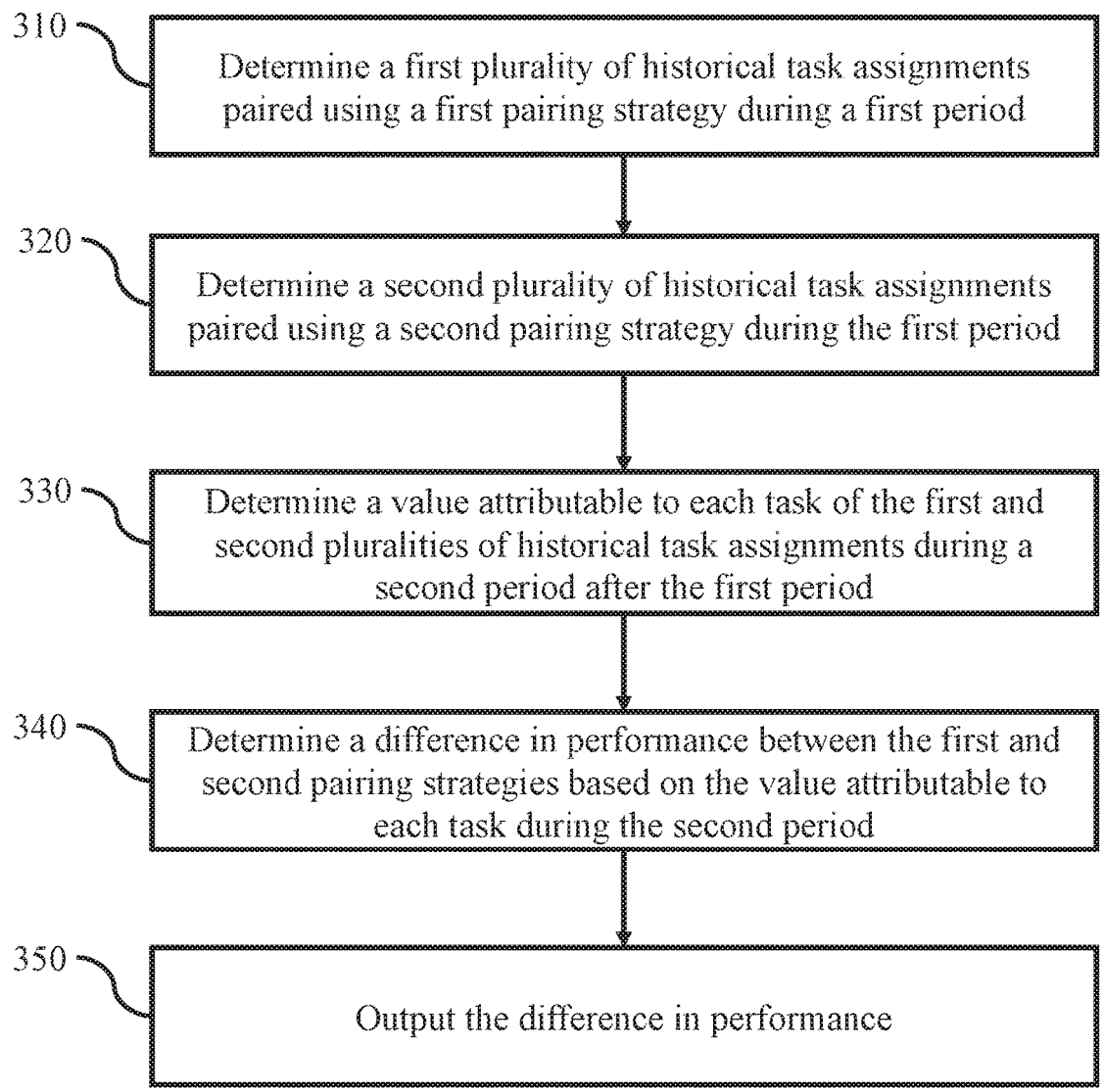
FIG. 3 shows a flow diagram of a benchmarking method according to embodiments of the present disclosure.

FIG. 3 shows a flow diagram of a benchmarking method 300 according to embodiments of the present disclosure.

Benchmarking method 300 may begin at block 310. At block 310, a first plurality of historical task assignments paired using a first pairing strategy during a first period may be determined. In the example described above, this may be the customer interactions for customers A-D who are part of the Year 1 cohort for the BP strategy.

Benchmarking method 300 may proceed to block 320. At block 320, a second plurality of historical task assignments paired using a second pairing strategy during the first period may be determined. In the example described above, this may be the customer interactions for customers F-I who are part of the Year 1 cohort for the FIFO strategy. In some embodiments, block 320 may be performed prior to, or concurrently with, block 310.

Benchmarking method 300 may proceed to block 330. At block 330, a value attributable to each task of the first and second pluralities of historical task assignments during a second period after the first period may be determined. In the example described above, this may be the values associated with each customer interaction in Year 2 associated with a customer that was part of the Year 1 cohort for BP or FIFO.

Benchmarking method 300 may proceed to block 340. At block 340, a difference in performance between the first and second pairing strategies may be determined based on the value attributable to each task during the second period. In the example described above, this may be the difference in performance associated with the Y1 cohort after Year 2.

Benchmarking method 300 may proceed to block 350. At block 350, the difference in performance may be outputted. In some embodiments, the outputted difference in performance may be combined (e.g., cumulatively) with one or more additional differences in performance measured for other periods. In the example described above, this may be the cumulative difference in performance associated with the Y1 and Y2 cohorts after Year 2.

After block 350, benchmarking method 300 may end.

Figure 4:
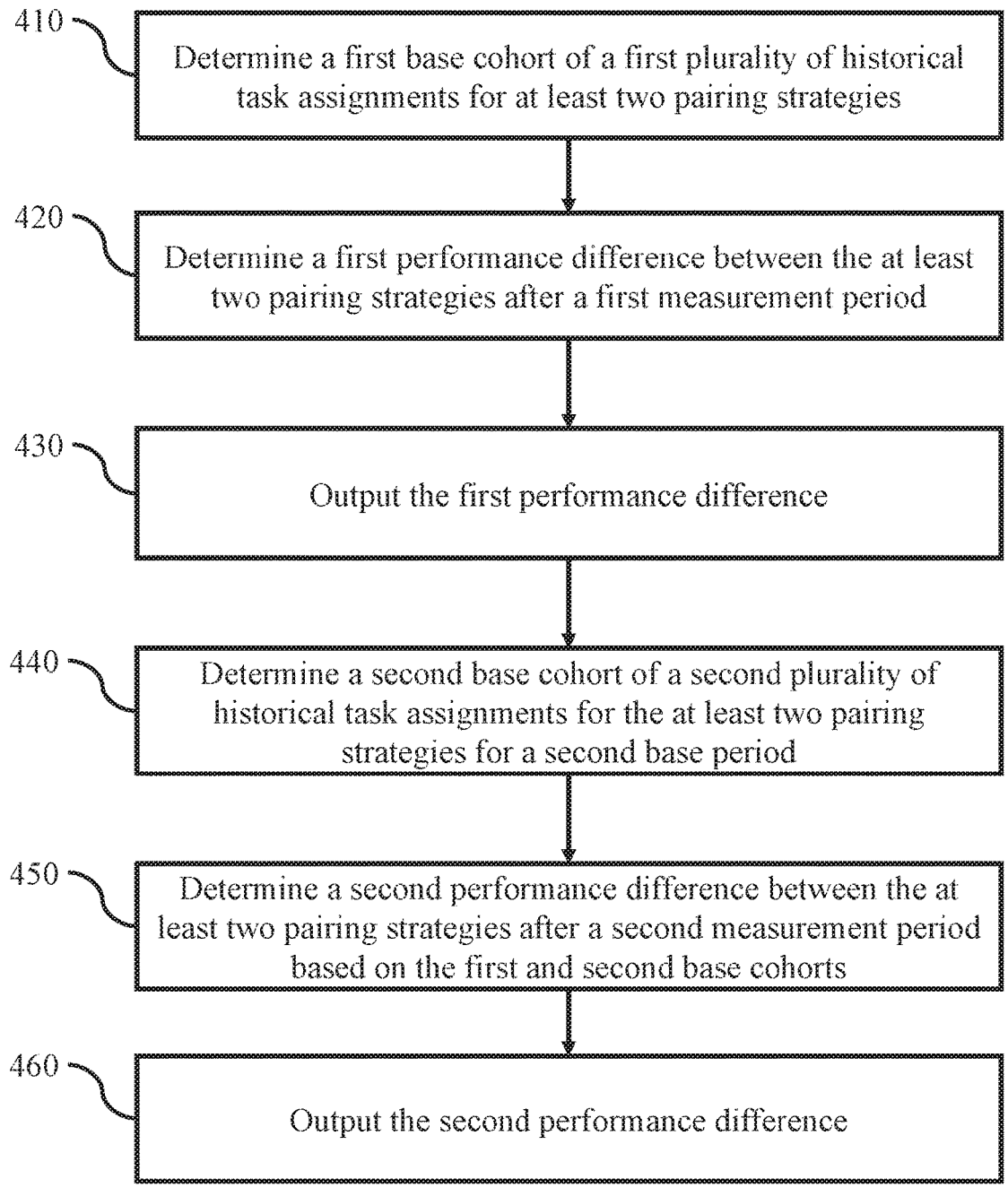
FIG. 4 shows a flow diagram of a benchmarking method according to embodiments of the present disclosure.

FIG. 4 shows a flow diagram of a benchmarking method 400 according to embodiments of the present disclosure.

Benchmarking method 400 may begin at block 410. At block 410, a first base cohort of a first plurality of historical task assignments may be determined for at least two pairing strategies. In the example described above, this may be the customer interactions associated with the Y1 cohort for BP and FIFO after Year 1.

Benchmarking method 400 may proceed to block 420. At block 420, a first performance difference between the at least two pairing strategies may be determined after a first measurement period. In the example described above, this may be the performance difference associated with the Y1 cohort for BP and FIFO after Year 2.

Benchmarking method 400 may proceed to block 430. At block 430, the first performance difference may be outputted. In some embodiments, benchmarking method 400 may end.

In other embodiments, benchmarking method 400 may proceed to block 440. At block 440, a second base cohort of a second plurality of historical task assignments may be determined for the at least two pairing strategies for a second base period. In some embodiments, the second base period may correspond to the first measurement period associated with block 420. In the example described above, this may be the customer interactions associated with the Y2 cohort for BP and FIFO after Year 2.

Benchmarking method 400 may proceed to block 450. At block 450, a second performance difference between the at least two pairing strategies may be determined after a second measurement period based on the first and second base cohorts. In the example described above, this may be the cumulative performance difference associated with the Y1 and Y2 cohorts for BP and FIFO after Year 3. In some embodiments, the second performance difference may include a greater number of additional, intermediate performance differences associated with additional cohorts. In the example described above, the cumulative performance difference after Year 6 included (intermediate) performance differences associated with the cohorts from each of Years 1-6.

Benchmarking method 400 may proceed to block 460. At block 460, the second performance difference may be outputted.

After block 460, benchmarking method 400 may end.

At this point it should be noted that techniques for benchmarking pairing strategies in a task assignment system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with benchmarking pairing strategies in a task assignment system in accordance with the present disclosure as described above. Alternatively, one or more processors operating in accordance with instructions may implement the functions associated with benchmarking pairing strategies in a task assignment system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for benchmarking pairing strategies in a task assignment system, the method comprising:
   pairing, by at least one computer processor configured to perform task assignment operations in the task assignment system, a first plurality of historical task assignments using a first pairing strategy during a first period, wherein the pairing comprises establishing, by a switch of the task assignment system, a connection between each of the first plurality of historical task assignments and a respective agent based upon the first pairing strategy;
   pairing, by the at least one computer processor, a second plurality of historical task assignments using a second pairing strategy during the first period, wherein the pairing comprises establishing, by a switch of the task assignment system, a connection between each of the second plurality of historical task assignments and a respective agent based upon the second pairing strategy;
   determining, by the at least one computer processor, a value attributable to each task of the first plurality of historical task assignments and the second plurality of historical task assignments during a second period after the first period;
   determining, by the at least one computer processor, a difference in performance between the first and second pairing strategies based on the value attributable to each task during the second period and which of the first or second pairing strategy was used to pair each task during the first period, wherein the difference in performance provides an indication that pairing tasks using the first pairing strategy results in a performance gain for the task assignment system attributable to the first pairing strategy, wherein the difference in performance also provides an indication that optimizing performance of the task assignment system is realized using the first pairing strategy instead of the second pairing strategy; and
   outputting, by the at least one computer processor, the difference in performance between the first pairing strategy and the second pairing strategy for benchmarking at least the first pairing strategy and the second pairing strategy.

2. The method of claim 1, wherein the task assignment system is a contact center system, and wherein the first plurality of tasks is a first plurality of contacts and the second plurality of historical task assignments is a second plurality of contacts.

3. The method of claim 1, wherein the first pairing strategy is a behavioral pairing strategy.

4. The method of claim 1, wherein the second pairing strategy is a FIFO strategy or a performance-based routing strategy.

5. The method of claim 1, wherein the task assignment system cycles among at least the first and second pairing strategies at least once per hour.

6. The method of claim 1, wherein the difference in performance is adjusted for the Yule-Simpson effect.

7. The method of claim 1, wherein the difference in performance is weighted according to a relative difference in size between the first and second pluralities of historical task assignments.

8. The method of claim 1, wherein the first pairing strategy assigns a task to an agent during the second period irrespective of determining which of the first pairing strategy or the second pairing strategy had assigned a corresponding task during the first period.

9. The method of claim 8, further comprising:
generating, by the at least one computer processor, a report of statistically fair assignment of tasks during the second period irrespective of which of the first pairing strategy or the second pairing strategy had assigned any corresponding tasks during the first period.

10. A system for benchmarking pairing strategies in a task assignment system, the system comprising:
at least one computer processor configured to perform task assignment operations in the task assignment system, wherein the at least one computer processor is further configured to:
pair a first plurality of historical task assignments using a first pairing strategy during a first period, wherein the pairing comprises establishing, by a switch of the task assignment system, a connection between each of the first plurality of historical task assignments and a respective agent based upon the first pairing strategy;
pair a second plurality of historical task assignments using a second pairing strategy during the first period, wherein the pairing comprises establishing, by a switch of the task assignment system, a connection between each of the second plurality of historical task assignments and a respective agent based upon the second pairing strategy;
determine a value attributable to each task of the first plurality of historical task assignments and the second plurality of historical task assignments during a second period after the first period;
determine a difference in performance between the first and second pairing strategies based on the value attributable to each task during the second period and which of the first or second pairing strategy was used to pair each task during the first period, wherein the difference in performance provides an indication that pairing tasks using the first pairing strategy results in a performance gain for the task assignment system attributable to the first pairing strategy, wherein the difference in performance also provides an indication that optimizing performance of the task assignment system is realized using the first pairing strategy instead of the second pairing strategy; and
output the difference in performance between the first pairing strategy and the second pairing strategy for benchmarking at least the first pairing strategy and the second pairing strategy.

11. The system of claim 10, wherein the task assignment system is a contact center system, and wherein the first plurality of tasks is a first plurality of contacts and the second plurality of historical task assignments is a second plurality of contacts.

12. The system of claim 10, wherein the first pairing strategy is a behavioral pairing strategy.

13. The system of claim 10, wherein the second pairing strategy is a FIFO strategy or a performance-based routing strategy.

14. The system of claim 10, wherein the task assignment system cycles among at least the first and second pairing strategies at least once per hour.

15. The system of claim 10, wherein the difference in performance is adjusted for the Yule-Simpson effect.

16. The system of claim 10, wherein the difference in performance is weighted according to a relative difference in size between the first and second pluralities of historical task assignments.

17. The system of claim 10, wherein the first pairing strategy assigns a task to an agent during the second period irrespective of determining which of the first pairing strategy or the second pairing strategy had assigned a corresponding task during the first period.

18. The system of claim 17, wherein the at least one computer processor is further configured to:
generate a report of statistically fair assignment of tasks during the second period irrespective of which of the first pairing strategy or the second pairing strategy had assigned any corresponding tasks during the first period.

19. An article of manufacture for benchmarking pairing strategies in a task assignment system, the article of manufacture comprising:
a non-transitory processor readable medium; and
instructions stored on the medium;
wherein the instructions are configured to be readable from the medium by at least one computer processor configured to perform task assignment operations in the task assignment system and thereby cause the at least one computer processor to operate so as to:
pair a first plurality of historical task assignments using a first pairing strategy during a first period, wherein the pairing comprises establishing, by a switch of the task assignment system, a connection between each of the first plurality of historical task assignments and a respective agent based upon the first pairing strategy;
pair a second plurality of historical task assignments using a second pairing strategy during the first period, wherein the pairing comprises establishing, by a switch of the task assignment system, a connection between each of the second plurality of historical task assignments and a respective agent based upon the second pairing strategy;
determine a value attributable to each task of the first plurality of historical task assignments and the second plurality of historical task assignments during a second period after the first period;
determine a difference in performance between the first and second pairing strategies based on the value attributable to each task during the second period and which of the first or second pairing strategy was used to pair each task during the first period, wherein the difference in performance provides an indication that pairing tasks using the first pairing strategy results in a performance gain for the task assignment system attributable to the first pairing strategy, wherein the difference in performance also provides an indication that optimizing performance of the task assignment system is realized using the first pairing strategy instead of the second pairing strategy; and output the difference in performance between the first pairing strategy and the second pairing strategy for benchmarking at least the first pairing strategy and the second pairing strategy.

20. The article of manufacture of claim 19, wherein the task assignment system is a contact center system, and wherein the first plurality of tasks is a first plurality of contacts and the second plurality of historical task assignments is a second plurality of contacts.

21. The article of manufacture of claim 19, wherein the first pairing strategy is a behavioral pairing strategy.

22. The article of manufacture of claim 19, wherein the second pairing strategy is a FIFO strategy or a performance-based routing strategy.

23. The article of manufacture of claim 19, wherein the task assignment system cycles among at least the first and second pairing strategies at least once per hour.

24. The article of manufacture of claim 19, wherein the difference in performance is adjusted for the Yule-Simpson effect.

25. The article of manufacture of claim 19, wherein the difference in performance is weighted according to a relative difference in size between the first and second pluralities of historical task assignments.

26. The article of manufacture of claim 19, wherein the first pairing strategy assigns a task to an agent during the second period irrespective of determining which of the first pairing strategy or the second pairing strategy had assigned a corresponding task during the first period.

27. The article of manufacture of claim 26, wherein the at least one computer processor is further caused to operate so as to:
generate a report of statistically fair assignment of tasks during the second period irrespective of which of the first pairing strategy or the second pairing strategy had assigned any corresponding tasks during the first period.

28. A method for benchmarking pairing strategies in a task assignment system, the method comprising:
pairing, by at least one computer processor configured to perform task assignment operations in the task assignment system, a first task using a first pairing strategy during a first period, wherein the pairing comprises establishing, by a switch of the task assignment system, a connection between the first task and a first corresponding agent based upon the first pairing strategy;
pairing, by the at least one computer processor, a second task using a second pairing strategy during the first period, wherein the pairing comprises establishing, by a switch of the task assignment system, a connection between the second task and a second corresponding agent based upon the second pairing strategy;
determining, by the at least one computer processor, a first performance value associated with the first task paired using the first or second pairing strategy during a second period, wherein the first performance value is attributable to the first pairing strategy;
determining, by the at least one computer processor, a second performance value associated with the second task paired using the first or second pairing strategy during the second period, wherein the second performance value is attributable to the second pairing strategy;
determining, by the at least one computer processor, a difference in performance between the first and second pairing strategies based at least in part on the first and second performance values, wherein the difference in performance provides an indication that pairing tasks using the first pairing strategy results in a performance gain for the task assignment system attributable to the first pairing strategy, wherein the difference in performance also provides an indication that optimizing performance of the task assignment system is realized using the first pairing strategy instead of the second pairing strategy; and
outputting, by the at least one computer processor, the difference in performance between the first and second pairing strategies.

29. The method of claim 28, wherein the first task was paired using the second pairing strategy during the second period.

30. The method of claim 28, wherein the second task was paired using the first pairing strategy during the first period.

* * * * *